July 16, 1957  J. J. BALCIUNAS  2,799,511
ADJUSTABLE SCROLL CHUCK
Filed March 11, 1955
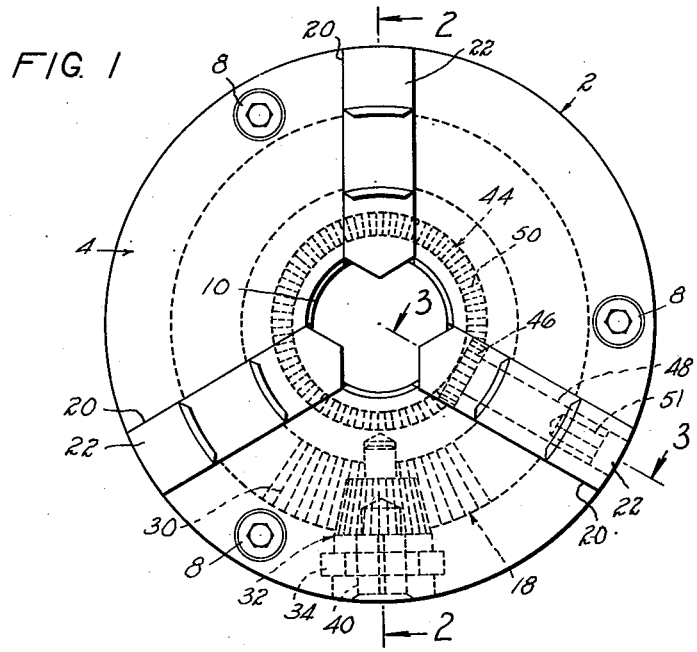
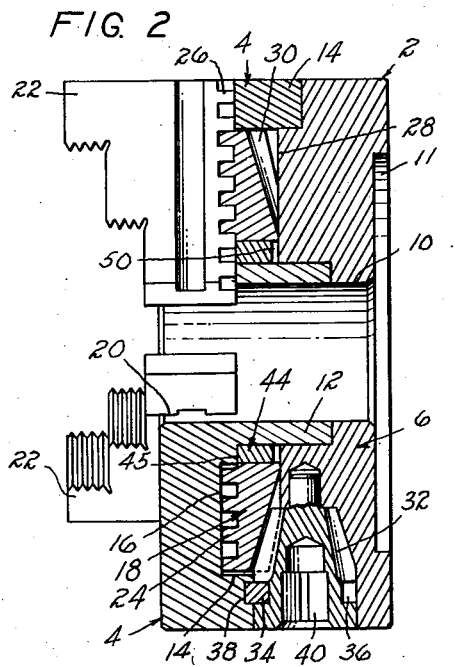
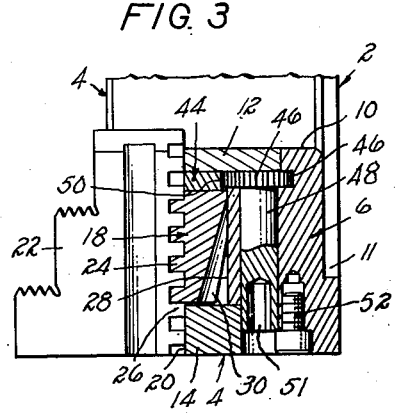
INVENTOR
JOSEPH J. BALCIUNAS

United States Patent Office 2,799,511
Patented July 16, 1957

2,799,511

ADJUSTABLE SCROLL CHUCK

Joseph J. Balciunas, New Britain, Conn., assignor to The Skinner Chuck Company, New Britain, Conn., a corporation of Connecticut Application March 11, 1955, Serial No. 493,767

5 Claims. (Cl. 279—116)

This invention relates to scroll chucks, and more particularly to improved means for improving the centering of a workpiece held between the jaws of a scroll chuck with respect to the rotational axis of the drive spindle.

While scroll chucks have many advantages from the standpoint of jaw capacity and simplicity of operation, it is recognized that such chucks do not have the centering accuracy of a chuck with independently adjustable jaws. Chucks with independently adjustable jaws, however, require time-consuming and painstaking adjustment each time a new piece of work is mounted therein and are therefore not satisfactory for production operations. Hence numerous attempts have been made in the past to develop a chuck having all the advantages of a conventional scroll chuck and having the centering accuracy of an independent chuck. Such attempts have generally involved the use of a separately adjustable adapter placed between the chuck and the drive spindle and upon which the whole chuck is shifted bodily to correct for any centering inaccuracies. Such an arrangement, however, suffers from several disadvantages, among which are the fact that the shifting of the whole chuck throws substantially its entire weight off-center and thereby creates substantial unbalanced centrifugal forces when the chuck is rotated. Shifting of the whole chuck relative to the adapter also usually requires either a loosening of the bolts or other means by which the chuck is secured to the adapter, which complicates the adjustment and may defeat its purpose by introducing further errors, or, if the bolts are not so loosened, the adjustment itself is liable to create considerable unrelieved strain on the bolts or other parts of the chuck such that subsequent operation of the chuck will disturb the adjustment. As a result, such prior art arrangements have not been completely satisfactory. One object of the present invention therefore is to provide an improved scroll chuck having the jaw capacity and simplicity of adjustment of a conventional scroll chuck and having novel and improved means for adjusting the axis of a workpiece held between the jaws of the chuck relative to the rotational axis of the chuck.

Another object is to provide an improved jaw locating arrangement for a scroll chuck which completely eliminates the need for a separate adapter.

Another object is to provide a scroll chuck having an improved jaw locating arrangement which, in correcting a jaw centering error, displaces a minimum number of parts involving only a small fraction of the total weight of the chuck.

Another object is to provide in a scroll chuck improved means for correcting jaw centering inaccuracies which is simplified in construction and easy to use, and which is completely self-contained in the chuck itself.

Another object is to provide in a scroll chuck an improved centering adjustment which does not require loosening or unfastening of any portion of the chuck from its fully assembled condition, and which in use does not create any unrelieved strain in the chuck.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing:

Figure 1 is a front elevation view of a scroll chuck constructed in accordance with the present invention;

Figure 2 is a sectional view of the structure shown in Figure 1 taken on the line 2—2 thereof; and Figure 3 is a sectional view of the structure shown in Figure 1 taken on the line 3—3 thereof.

Referring to the drawing, a scroll chuck constructed in accordance with the present invention includes a cylindrical body 2 consisting of a front plate 4 and a back plate 6 fastened together by a plurality of circumferentially spaced bolts 8, and having a central bore 10 forming a work opening. The front plate has a rearwardly extending central flange or hub 12 and a rearwardly extending outer flange 14 which mate with peripheral grooves in the back plate for enhanced rigidity, and the back of the back plate 6 has a concentric cylindrical recess 11 for receiving the adapter plate of a drive spindle. Hub 12 and flange 14 define an annular recess 16 in the front plate which freely accommodates the scroll plate 18 of the chuck. The front face of the front plate has a plurality of radial jaw grooves 20 which connect with the annular recess 16 and in which are slidably received the jaws 22 of the chuck. The front of the scroll plate is formed with the usual spiral teeth 24, which mesh with corresponding teeth 26 on the back of each of the jaws 22, the scroll plate being supported against rearward axial movement by the front face 28 of back plate 6.

To enable rotation of the scroll plate 18, its back is formed with bevel gear teeth 30 which mesh with the teeth of one or more bevel pinions journaled in the back plate. In the specific embodiment set forth in the drawing there is shown for this purpose a single pinion 32 secured in the chuck and its thrust loads are absorbed by an arc-shaped retainer key 34 received in a groove 36 in the pinion and in a corresponding groove 38 in flange 14. A wrench socket 40 on the outer end of the pinion 32 facilitates rotation thereof to rotate the scroll plate 18 and move the jaws 22 in or out.

In accordance with the invention, the scroll plate 18 is rotatably mounted exclusively on an eccentric ring 44, which is in turn rotatably mounted on the hub 12 of front plate 4. The ring is supported against axial movement by a radial shoulder 45 on the front end of hub 12 and by the front face 28 of back plate 6, and the inside surface of the ring 44 is cylindrical and concentric with the axis of the bore 10 and recess 11. The outside surface of the ring is also cylindrical but its center is displaced relative to the center of the inside surface by a few thousandths of an inch, such as for example .003 inch. With this arrangement it will be appreciated that when the ring 44 is rotated relative to the hub 12, the scroll plate 18 will be shifted about the axis of bore 10 and recess 11, such movement being accommodated by the clearance space afforded by annular recess 16 and by the clearance between the gear teeth 30 and the teeth of pinion 32, and will correspondingly displace the chuck jaws 22 in unison. Rotative adjustment of the ring 44 is provided by means of a control gear 46 fixed on the inner end of a radially extending stub shaft 48 journaled in the back plate 6. The teeth of the control gear mesh with corresponding teeth 50 which are formed in the rearward side of the eccentric ring and extend about the entire circumference of the ring. The outer end of stub shaft 48 is disposed adjacent the surface of the chuck for easy access and has a socket 51 adapted to receive a wrench by which the stub shaft may be conveniently turned to rotate the eccentric ring 44 relative to the hub 12. A setscrew 52 is provided in the back plate for locking the stub shaft against rotation except while the centering adjustment is being made.

With this arrangement inaccuracies in the location of the jaws of the chuck relative to the axis of the drive spindle may be compensated for quickly and easily simply by loosening the setscrew 52 and turning stub shaft 48 sufficiently to rotate the eccentric ring 44 relative to front plate 4 and scroll plate 18 until the radial displacement of the scroll plate by the ring 44 has minimized the centering error of the jaws 22 or scroll plate 18. The control gear 46 and stub shaft 48 may then be locked simply by tightening up the setscrew 52, and the chuck is then ready for use. Since only the scroll plate and jaws themselves are displaced relative to the axis of the drive spindle in correcting the centering error, and since the weight of these few parts represents only a small fraction of the weight of the chuck, it will be appreciated that with the above-described arrangement the correction of the centering error unbalances the chuck a minimum amount, and hence minimizes any out of balance forces which may be developed during rotation of the chuck. It will also be recognized that the centering adjustment may be made without loosening or unfastening any of the parts of the chuck except, of course, the setscrew 52, so that the arrangement described precludes any possibility of defeating the purpose of the adjustment by permitting a shift in the position of the jaws of the chuck relative to the axis of the drive spindle other than that produced by rotation of the eccentric ring 44. Moreover, since only the scroll plate 18 and the jaws positioned thereby are shifted, and since the scroll plate is supported exclusively on the eccentric ring 44, and is freely movable radially in the annular recess 16, it will be evident that the centering adjustment does not require any flexing of any of the parts of the chuck, and thus does not create any unrelieved strains which might subsequently disturb the adjustment during operation of the chuck. Thus a jaw centering arrangement constructed in accordance with the present invention is not only simplified in construction and easy to use, but completely eliminates the need for a separate adjustable adapter for the chuck.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:

1. In a scroll chuck, a body adapted to be mounted on a spindle, a scroll plate mounted within the body for radial and rotational movement relative thereto within a plane normal to the rotational axis of the body, a plurality of jaws mounted for movement radially of the body and having teeth engageable with the scroll plate, means for rotating the scroll plate to open and close the jaws, and eccentric means supporting the scroll plate relative to the body and rotatable relative to the body and the scroll plate for moving the scroll plate relative to the body in a plane normal to the axis of rotation of the body.

2. In a scroll chuck, a body adapted to be mounted on a spindle, an axially extending cylindrical support on the body concentric with the axis of the body, a plurality of radially movable jaws on the front of the body, a scroll plate engageable with the jaws to control opening and closing thereof, an eccentric ring rotatably mounted on the support and exclusively rotatively supporting and rotatable relative to said scroll plate, and means supported by the body for rotatively adjusting said eccentric ring relative to said cylindrical support and said scroll plate.

3. In a scroll chuck, a cylindrical body having a back plate and a front plate provided with a central throughbore and adapted to be mounted coaxially on a rotatable drive spindle, a cylindrical hub projecting from the interior face of one of said plates concentric with the axis of rotation of said body, an eccentric ring rotatable on the hub, means in said body for adjusting the relative angular position of said eccentric ring and said hub, a scroll plate rotatably supported exclusively on said ring and rotatable relative thereto, a plurality of radially slidable jaws on the front plate having teeth engageable with said scroll plate, and means for rotating the scroll plate relative to said jaws and said eccentric ring.

4. In a scroll chuck, a body adapted to be mounted on a rotatable drive spindle including a front plate having a central throughbore and axially extending inner and outer flanges forming an annular recess, said inner flange having an outer surface concentric with the axis of rotation of the body, a plurality of radially movable jaws on the front plate, a rotatable scroll plate in the recess engageable with the jaws to control opening and closing thereof, a ring rotatably mounted on said inner flange having a cylindrical outer surface eccentric with the axis of rotation of the body and exclusively rotatively supporting and being rotatable relative to said scroll plate, means for rotating the scroll plate relative to the jaws, and means for rotating the ring relative to said inner flange and the scroll plate.

5. In a scroll chuck, a body adapted to be mounted on a rotatable drive spindle including a front plate having a central throughbore and axially extending inner and outer flanges forming an annular recess, said inner flange having an outer surface concentric with the axis of rotation of the body, a plurality of radially movable jaws on the front plate, a scroll plate in the recess engageable with the jaws to control opening and closing thereof, a ring rotatably mounted on said inner flange having a cylindrical outer surface eccentric with the axis of rotation of the body and exclusively rotatively supporting and being rotatable relative to said scroll plate, means for rotating the scroll plate relative to the jaws, and means for rotating the ring relative to said inner flange and said scroll plate including a rotatable control gear within the body drivingly engageable with the ring and a radially extending stub shaft for turning the control gear.

References Cited in the file of this patent

UNITED STATES PATENTS

| | | |
|---|---|---|
| 2,456,776 | Faust | Dec. 21, 1948 |
| 2,639,157 | Buck et al. | May 19, 1953 |
| 2,684,251 | Church | July 20, 1954 |